(No Model.) 2 Sheets—Sheet 2.
W. R. DERR.
WHEEL FENDER FOR STREET CARS.
No. 551,851. Patented Dec. 24, 1895.
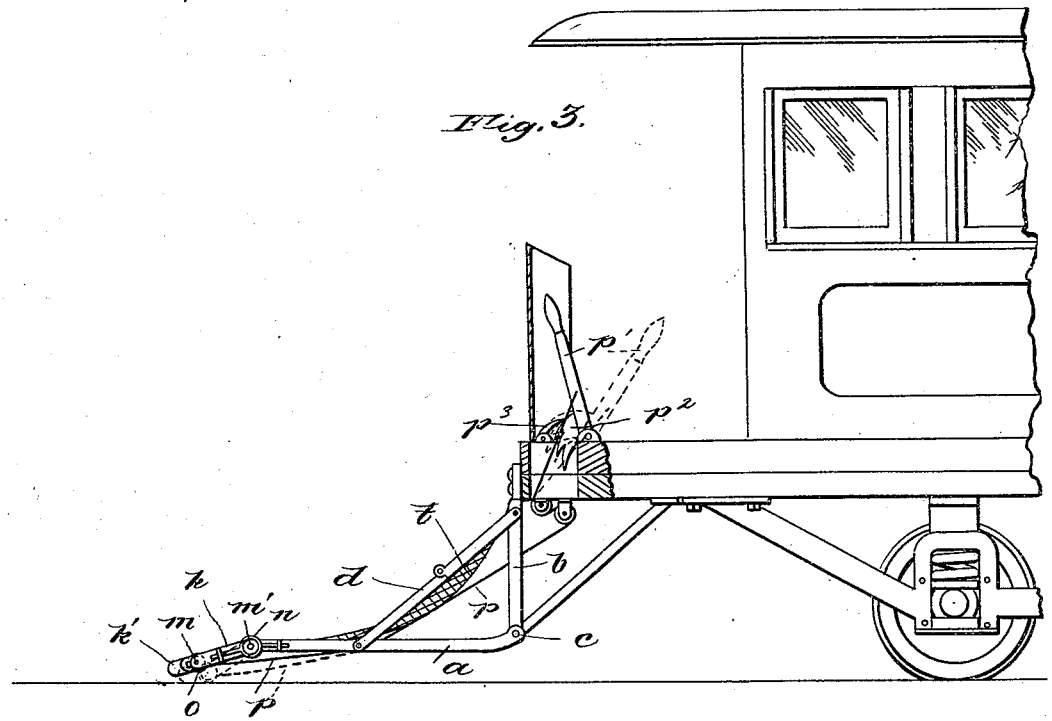
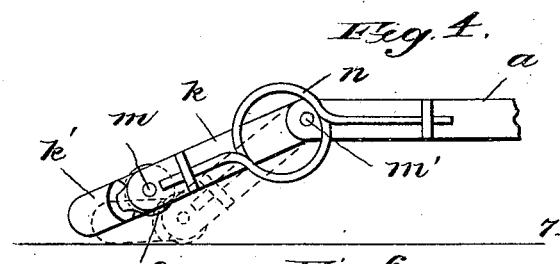
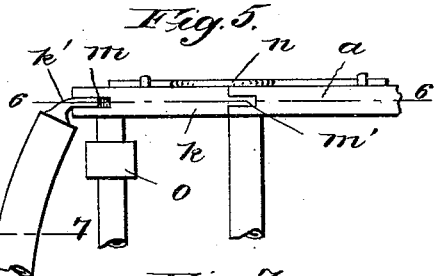
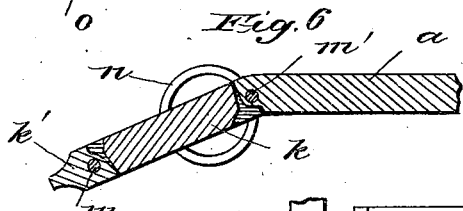
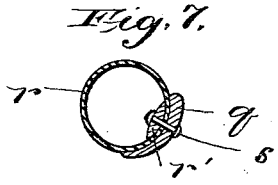
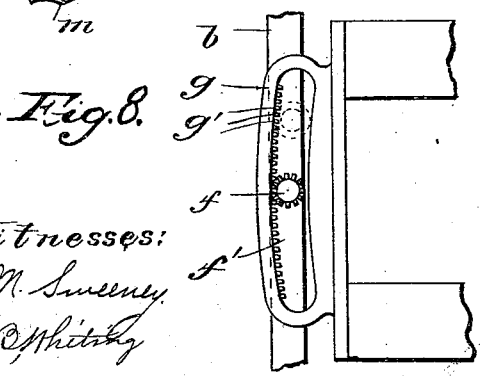
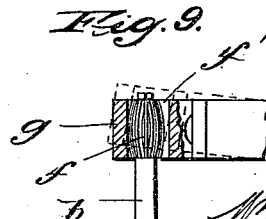
Witnesses:
C. M. Sweeney
Geo. B. Whiting
Inventor:
Wm. R. Derr,
by Henry Calver
Atty.
ANDREW B.GRAHAM.PHOTO-LITHO.WASHINGTON,D.C.

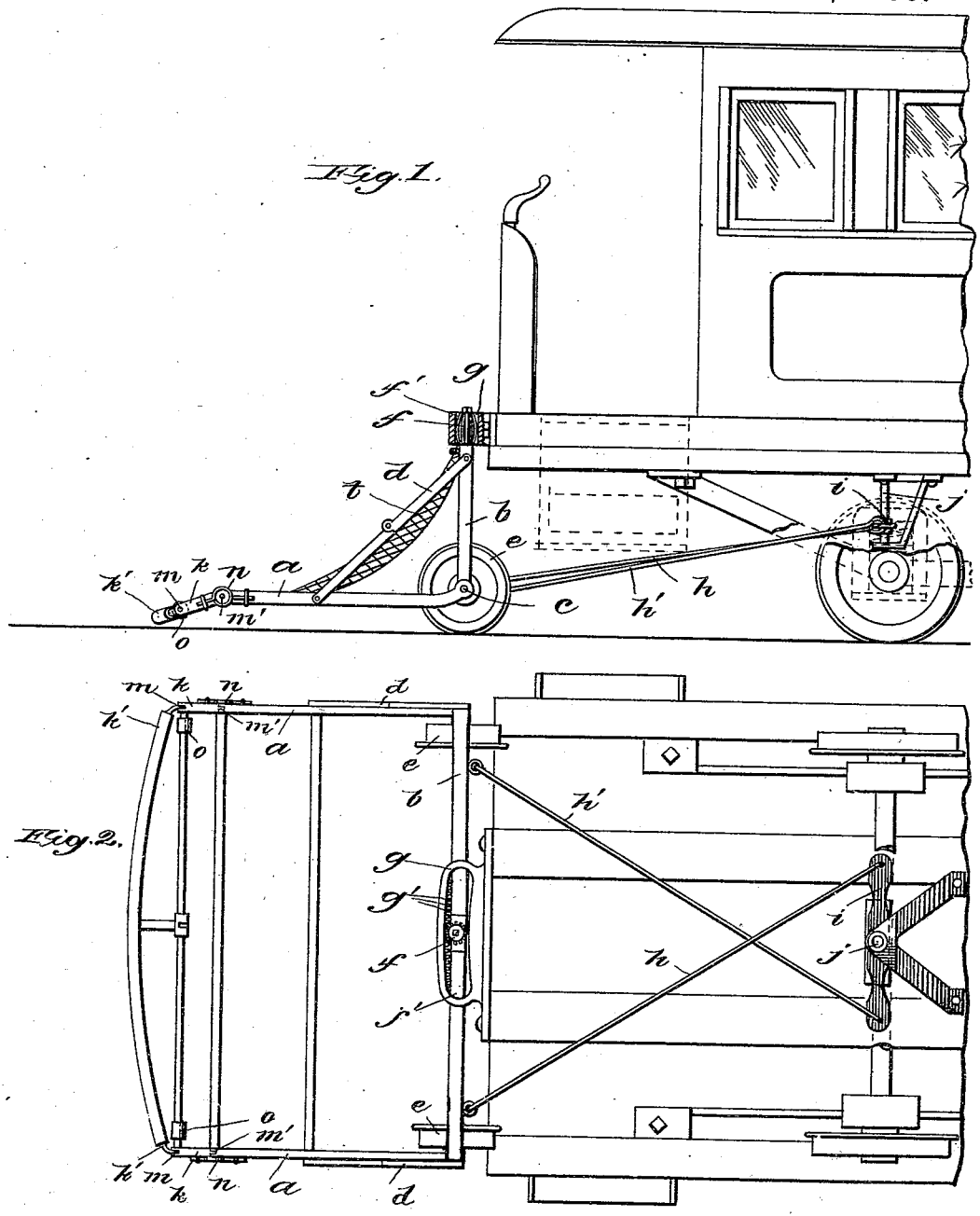

UNITED STATES PATENT OFFICE.

WILLIAM R. DERR, OF BALTIMORE, MARYLAND.

WHEEL-FENDER FOR STREET-CARS.

SPECIFICATION forming part of Letters Patent No. 551,851, dated December 24, 1895.

Application filed April 26, 1895. Serial No. 547,269. (No model.)

*To all whom it may concern:*

Be it known that I, WILLIAM R. DERR, a citizen of the United States, residing at Baltimore, in the State of Maryland, have invented certain new and useful Improvements in Wheel-Fenders for Street-Cars, of which the following is a specification, reference being had therein to the accompanying drawings.

My invention relates to fenders or safety-guards for street-cars; and my improvement consists, briefly, in providing a fender which has a compound or two-part tipping bar at its forward end of peculiar construction, said tipping bar being arranged so that immediately an obstacle or person is struck the bar automatically assumes such a position relative to the track as to preclude all danger of the person being rolled beneath the car by reason of the fender riding up on the body when prostrate. This position of the tipping bar will be maintained as long as any resistance is made to the forward movement of the fender by the obstacle, but as soon as the obstacle is removed or thrown to one side by the action of the fender the tipping bar assumes its normal raised position. This is the essential feature of my invention; but other novel constructions will be set forth in the detailed description which follows and will be particularly pointed out in the claims at the end of the specification.

In the drawings, Figure 1 is a side view of the end portion of a car, showing my improved fender attached thereto. Fig. 2 is a bottom view of the car and fender. Fig. 3 shows a slightly-modified form of my invention. Figs. 4 and 5 are detail views of the tipping bar and impact-rod. Fig. 6 is a view on line 6 6, and Fig. 7 a view on line 7 7 of Fig. 5. Figs. 8 and 9 are detail views of the steadying-pinion and guide.

The main body of my improved fender is made up of two rectangular frames $a\ b$, formed of light metal bars or tubing, hinged together at $c$, so that the frame $a$, which, when in operative position, lies parallel with the track, may be folded back against the upright frame $b$ when not in use. Side bars $d$ having rule-joints midway their length are pivoted to the said frames $a\ b$ and support frame $a$ when in its lower or operative position, the rule-joints at the middle of said bars $d$ preventing the bars from breaking in but one direction—namely, that direction which allows the frame $a$ to be folded back.

Journaled on the lower cross-bar of the frame $b$ are two wheels $e$ which travel upon the rails of the track and support the entire fender. On the upper cross-bar of said frame $b$ and centrally thereof is mounted a gear-wheel or pinion $f$ which is larger in diameter through its center and smaller at each end, so that its periphery is curved in vertical cross-section. Said pinion $f$ travels in and bears against the front wall of a curved slot $f'$ in a frame $g$ which is secured to the front end of the car, being preferably bolted to the ends of the sills, as shown. The front wall of slot $f'$ is provided with gear-teeth $g'$ which mesh with the pinion $f$. By this construction the fender is supported in such a manner as to permit it to follow the curvature of the track, the slot $f'$ permitting the pinion to move from side to side as the end of the car-body swings off the curve in rounding a corner.

The peculiar shape of the pinion $f$ in cross-section, made smaller at its ends, is to overcome the difficulty which would arise from the oscillating or "teetering" of the car-body, for it is obvious that if the ordinary straight-sided pinion were used the car motion would lift the fender from the track.

I provide the pinion and gear-teeth in order that the action may be positive and not trust to a sliding contact between the moving parts, for this has been found objectionable in some respects.

Loosely jointed to eyebolts on the lower cross-bar of the upright frame $b$ are two rods $h\ h'$, which extend rearwardly to a horizontal bar $i$ pivotally mounted on a vertical post $j$ held in a suitable frame secured to the bottom of the car. The two rods $h\ h'$ cross each other and connect with the opposite ends of the bar $i$. These rods $h\ h'$ drive the fender along the track, and the bar $i$ swinging on its pivot-post $j$ permits the fender to travel along the track without regard to the lateral motion of the car.

I will now describe in detail the two-part tipping bar which is secured to the front of the frame $a$. Said tipping bar consists of two parts $k\ k'$ hinged together at $m$ and hinged to the frame $a$ at $m'$. The hinges at $m'$ are of such construction as to allow the bar to be turned in one direction—viz., downward—while the hinges at $m$ permit movement of the part $k'$ in only one direction—viz., upward. Springs $n$ normally hold the compound tipping bar so that its forward member $k'$ is just above the track. When an obstacle is struck, however, the hinges $m'$ allow the compound tipping bar to be forced downward and immediately the member $k'$ of the bar strikes the track the hinges $m$ allow said member to be thrown upward and in a position parallel to the road-bed. I preferably place small rollers $o$ on the tipping bar, so that when it is forced downward it will have a rolling contact with the road-bed. While the action of the tipping bar is automatic, I have provided means by which the motorman may positively throw the bar to operative position. These means consist of a flexible connection $p$ between the rear member $k$ of the tipping bar and a suitable operating-lever $p'$, by throwing which latter the tipping bar, through the connection $p$, can be brought into operative position, said bar being held in operative position by means of the ratchet-plate $p^2$ and pawl $p^3$. The forward member $k'$ of the compound tipping bar forms, also, the impact-rod of the fender and is constructed in the following manner: Secured to the said member $k'$ is a metallic section $q$, which is nearly semicylindrical in cross-section and is thicker at its rear edge than at its front. Seated in the concavity of this curved section $q$ is a rubber hose or pipe $r$, which projects forward beyond the front edge of the metallic section $q$ and is secured thereto by means of a bar or plate $r'$, which lies within the hose-pipe section and is held by bolts $s$ passing through bar $r'$, pipe $r$, and section $q$, clamping them firmly together. By this construction the force of the blow as it strikes a body is modified by the yielding hose-pipe section and then the tipping bar operating as described prevents the body from being forced under the fender, but directs it upward onto the frame $a$ into a net $t$ suspended across the frame. The thickened portion of the section $q$ rests upon the track when the tipping bar is forced to the ground and takes the wear of such contact.

Referring to the modified form of fender shown in Fig. 3, it will be seen that I dispense with the wheels $e$ on the fender and suspend the same entirely from the front of the car as shown. The operation of the tipping bar is the same in this construction as in that just described. It will be obvious that I can carry the fender when thus suspended from the car-front very near the track, for while the fender when rigid with the car-body will receive the car motion, yet the tipping bar at the end of the fender when it strikes the road-bed because of violent oscillations of the car will break at its joints and obviate all danger of injury to the body of the fender.

Having thus described my invention, I claim and desire to secure by Letters Patent—

1. A car fender comprising a main frame or body portion, a compound tipping bar hinged to the forward end of said main frame, said bar being composed of two members one of which is hinged to the other, both members of said compound bar normally lying in an inclined position relative to the track, the rear member of said bar being adapted to be thrown downward into a position substantially at right angles to the road bed while the forward member of said bar is adapted to be thrown upward into a position parallel with and in close proximity to the road bed.

2. In a car fender, the combination with the main frame, of a compound or two-part spring supported tipping bar hinged to the forward end of said frame so that it is free to move downward on its hinges but limited in its upward movement, a flexible impact rod carried by the forward member of said tipping bar, said forward member being hinged to the rear member of the bar so as to have a free upward movement on its hinges but a limited downward movement.

3. In a car fender, the combination with a two-part frame hinged together, of supporting wheels upon which said frames are mounted, a cross bar pivoted in a suitable frame secured to the bottom of the car, rods connecting said cross bar with the axle of said supporting wheels, an anti-friction roller carried by one of said hinged frames, a slotted guiding frame secured to the car in which said anti-friction roller travels, and an automatically-operated compound or two-part tipping bar secured to the forward end of said hinged frames.

4. In a car fender, the combination with a main frame or body portion, supporting wheels therefor, a compound or two-part tipping bar hinged to the forward end of said fender, a pivoted cross bar carried by the car, connecting rods between said cross bar and main frame, a pinion carried by said main frame, and a frame carried by the car and having a curved slot formed therein, and gear teeth formed on one wall of said slot with which said pinion meshes, said pinion being made smaller at its ends so as to prevent the vertical oscillations of the car from being imparted to the fender.

5. In a car fender, the combination with the two frames $a$ and $b$ hinged together, of the supporting wheels $e$ for said frames, jointed side bars $d$ hinged at their opposite ends to said frames $a$ and $b$, a pivoted cross bar $i$ mounted in a suitable frame secured to the car bottom, rods $h$, $h'$ connecting said cross bar $i$ and said frame $b$, a pinion $f$ shaped substantially as described, the frame $g$ having the geared slot $f'$ in which said pinion travels, an automatic spring-supported tipping bar comprising two members $k$, $k'$ one of said members, $k$, being hinged to the forward end of said frame $a$ so as to move in one direction and the forward member $k'$ hinged to said other member $k$ so as to move in an opposite direction, and a net $t$ carried by said frames $a$ and $b$.

6. In a car fender, the combination of the main frame, of a spring-supported two-part tipping bar carried at the forward end of said main frame, one member of said bar being hinged to the main frame so as to have a limited movement in one direction, the other member of said bar being hinged to said first member so as to have a limited movement in the opposite direction, said last named member being substantially semi-cylindrical in cross section and having a thickened rear edge, and a flexible impact pipe seated in the concave face of said member and a clamping bar passing through said impact pipe and secured to the forward member of the tipping bar.

In testimony whereof I affix my signature in presence of two witnesses.

WILLIAM R. DERR.

Witnesses:
JOHN L. HEBB,
THOMAS J. DAIL.